Aug. 5, 1952 R. ADLER 2,606,300

ELECTRON DISCHARGE DEVICE

Filed Jan. 19, 1950 3 Sheets-Sheet 1

ROBERT ADLER
*INVENTOR.*

BY Francis W. Crotty
HIS ATTORNEY

ROBERT ADLER
*INVENTOR.*

BY Francis W. Crotty
HIS ATTORNEY

Aug. 5, 1952

R. ADLER 2,606,300

ELECTRON DISCHARGE DEVICE

Filed Jan. 19, 1950

3 Sheets-Sheet 3

ROBERT ADLER
*INVENTOR.*

BY Francis W. Crotty

HIS ATTORNEY

Patented Aug. 5, 1952

2,606,300

UNITED STATES PATENT OFFICE 2,606,300

ELECTRON DISCHARGE DEVICE

Robert Adler, Chicago, Ill., assignor to Zenith Radio Corporation, a corporation of Illinois Application January 19, 1950, Serial No. 139,401

19 Claims. (Cl. 313—72)

This invention relates to electronic communications systems, such as synchronizing-control apparatus for use in a television receiver or the like. More specifically, the invention is directed to the provision of a novel electron-discharge device which is particularly, but not exclusively useful as a synchronizing-control device.

In the reception of television signals, it is necessary to insure that the scanning operations at the receiver are maintained in synchronization with those at the transmitting station. For this purpose, the composite television signal radiated by commercial transmitting stations contains line-frequency and field-frequency synchronizing-signal components which are utilized at the receiver to drive local line-frequency and field-frequency scanning-signal generators. It has been found particularly advantageous to provide automatic-frequency-control at the receiver for the line-frequency synchronizing system, in order to prevent loss of synchronization in the event that large noise signals may be superimposed from time to time on the composite television signal. The automatic-frequency-control system may comprise, for example, a phase-detector operated in conjunction with a reactance-tube system or other frequency-control device to insure positive synchronizing action. Customarily, separate receiver stages are provided for each of the functions of synchronizing-signal separation, phase-comparison between the incoming synchronizing signals and the locally-generated scanning signals, and frequency-control of the local scanning-signal generator. In addition, a second scanning-signal generator is customarily used to provide field-frequency scanning signals for the image-reproducing device. It is a primary object of the present invention to provide a novel and improved electron-discharge device, for use in synchronizing-control apparatus for a television receiver or the like, which is capable of combining the functions of synchronizing-signal separation and phase-comparison in a single envelope.

It is a further object of the invention to provide an improved electron-discharge device for use in synchronizing-control apparatus having a minimum number of component parts.

Still another object of the invention is to provide an improved electron-discharge device which is eminently suited for performing the functions of synchronizing-signal separation, phase-comparison between incoming synchronizing signals and locally-generated scanning signals, and frequency-control of the local scanning-signal generator in a television receiver.

Yet a further object of the invention is to provide a novel and improved electron-discharge device of the focussed-beam type which may be advantageously employed as a combination synchronizing-signal separator, balanced automatic-frequency control phase-detector, and frequency-control device for controlling the frequency of the local scanning-signal generator in a television receiver.

In conventional television receivers utilizing automatic-frequency-control for the line-frequency scanning-signal generator, it is customary to use a pair of balanced diodes for comparing the phase of the incoming synchronizing-signal pulses with that of the locally-generated scanning-signals. With an arrangement of this type, random noise pulses occurring between adjacent synchronizing-signal pulses may contribute to the direct-voltage control signal which is applied to the frequency-control device and thereby result in false synchronization. Systems are known for gating the incoming synchronizing-signal pulses to prevent such false synchronization, but such systems have the disadvantage of requiring an additional number of circuit components and are therefore not generally used in commercial television receivers. It is, therefore, a further object of the invention to provide a novel electron-discharge device capable of performing in a single stage the functions of synchronizing-signal separation, automatic frequency-control phase-detection, and frequency-control of the local scanning-signal generator, while at the same time providing gating for the incoming synchronizing-signal components to reduce the effect of random noise pulses on receiver synchronization.

In accordance with the present invention, a novel and improved electron-discharge device comprises an electron gun for projecting a focussed electron beam. There is disposed across the path of the electron beam a control system including an accelerating electrode, having an aperture registering with the beam, followed by a control grid preferably spaced from the accelerating electrode by a distance greater than the smallest transverse dimension of the accelerating electrode aperture. A convergent electron lens is provided for refocussing electrons passed by the control grid, and a pair of anodes, respectively having active portions on opposite sides of the path of an undeflected electron beam emerging from the electron lens, are also provided. Preferably, the electron gun comprises an elongated cathode and a slotted accelerating electrode for projecting a sheet-like electron beam of substantially rectangular cross-section.

In accordance with another feature of the invention, a novel and improved electron-discharge device comprises an electron gun having an elongated cathode for projecting a sheet-like electron beam of substantially rectangular cross-section. The device also comprises a first electrode system including an intensity-control grid followed by a pair of anodes respectively having active portions on opposite sides of the path of a transverse portion of the beam and a second electrode system including a pair of electrostatic-deflection electrodes positioned on opposite sides of the path of another transverse portion of the beam.

In accordance with still another feature of the invention, a novel electron-discharge device comprises an electron gun, including an elongated cathode and an accelerating electrode having a slot, for projecting a sheet-like electron beam of substantially rectangular cross-section. A first electrode system is disposed across the path of a portion of the sheet-like beam and includes a control grid spaced from the accelerating electrode preferably at a distance greater than the smallest transverse dimension of the slot. The first electrode system also includes a convergent electron lens for refocussing electrons passed by the control grid, and a pair of anodes respectively having active portions on opposite sides of the path of an undeflected electron beam emerging from the electron lens. A second electrode system is arranged transversely of the path of another portion of the sheet-like beam. The second electrode system includes a pair of electrostatic-deflection electrodes and a plurality of anodes disposed in such space relation with respect to the deflection electrodes that the portion of the sheet-like beam projected between the deflection electrodes is switched from one of the last-mentioned anodes to another upon lateral deflection thereof.

The features of the present invention which are believed to be novel are set forth with particularity in the appended claims. The invention, together with further objects and advantages thereof, may more readily be understood, however, by reference to the following description taken in connection with the accompanying drawings in the several figures of which like reference numerals indicate like elements, and in which:

In the preferred embodiment of the present invention, a special electron-discharge device comprises two electrode systems, having a number of component parts in common with each other and effectively defining two independent electron-discharge paths, supported within an evacuated envelope. For convenience in explaining the operation of the invention, the two electrode systems are separately illustrated in cross-section in Figures 1 and 2 respectively.

Figure 1:
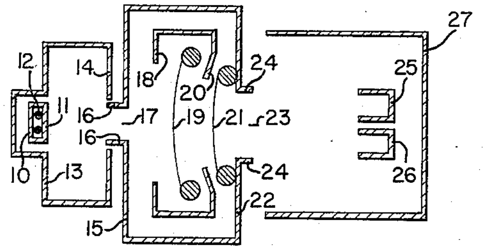
Figures 1 and 2 are different cross-sectional views of an electron-discharge device constructed in accordance with the present invention.

In Figure 1 the first electrode system of a discharge device or tube constructed in accordance with the invention comprises a cathode 10 having a substantially planar emitting surface 11 and provided with a heater element 12. An auxiliary electrode 13, having portions substantially coplanar with emitting surface 11, is arranged to restrict electron emission from cathode 10 to a single general direction. A focussing electrode 14, which may for convenience be constructed integrally with auxiliary electrode 13, is also provided, and a first accelerating electrode 15 is provided with a pair of opposed lips 16 extending toward cathode 10 and terminating at a distance from those boundaries of focussing electrode 14 nearest cathode 10 which does not exceed a small fraction of the width of the aperture 17 defined by lips 16. Cathode 10, auxiliary electrode 13, focussing electrode 14, and first accelerating electrode 15 constitute an electron gun which is constructed in accordance with the copending application of Robert Adler, Serial Number 68,285, filed December 30, 1948, for Electron-Discharge Devices of the Focussed-Beam Type, now U. S. Patent No. 2,559,037, dated July 3, 1951, and assigned to the present assignee.

Following the aperture 17 of first accelerating electrode 15, there are disposed in the order named a second focussing electrode 18, a control grid 19, a third focussing electrode 20, and a second accelerating electrode comprising a screen grid 21 and a beam-directing portion 22 having an aperture 23 defined by a pair of opposed lips 24 extending in a direction away from the electron gun. Control grid 19 is preferably spaced from first accelerating electrode 15 by a distance greater than the smallest transverse dimension of aperture 17. Consequently, accelerating electrode 15, and control grid 19 comprise a high-transconductance intensity-control system as disclosed and claimed in the copending application of Robert Adler, Serial Number 7,864, filed February 12, 1948, for Electron-Discharge Devices, now U. S. Patent No. 2,511,143, dated June 13, 1950, and assigned to the same assignee as the present application.

Third focussing electrode 20 and screen grid 21 constitute a convergent electron lens for refocussing electrons passed by control grid 19; this arrangement is identical with that described in the above-mentioned copending application Serial Number 68,285.

In accordance with the present invention, a pair of anodes 25 and 26, respectively having active portions on opposite sides of the path of an undeflected electron beam emerging from the electron lens comprising focussing electrode 20 and screen grid 21, are provided, and an additional anode 27 is positioned beyond anodes 25 and 26 to collect space electrons passing those anodes. Alternatively, anode 27 may be positioned between aperture 23 and anodes 25 and 26 and apertured to permit access of space electrons to those anodes.

While it is within the scope of the present invention to utilize a structure for producing a focussed pencil-like beam of circular cross-section, it is preferred that all of the electrodes extend in a direction perpendicular to the plane of the drawing for a distance which is large relative to the width of cathode 10; with such an arrangement, a focussed sheet-like electron beam of substantially rectangular cross-section is formed. The beam may be subjected to intensity-control by high-transconductance control grid 19 in the manner described in the above-identified copending applications, and the convergent electron lens following control grid 19 serves to refocus electrons passed by the control grid to project a refocussed beam through aperture 23. The refocussed beam emerging from the electron lens may then be subjected to deflection-control in a manner to be described in greater detail hereinafter, and the pair of anodes 25 and 26 may be utilized to derive a balanced output signal. Final anode 27, in addition to its function as a collector of space electrons not intercepted by anodes 25 and 26, may be connected to an output circuit to develop an additional useful output signal.

Anodes 25 and 26 preferably are identically constructed and positioned symmetrically with respect to the path of an undeflected electron beam emerging from the convergent electron lens. In order to suppress secondary emission from anodes 25, 26, and 27, each of these anodes is preferably provided with flanged portions extending toward the electron lens in such a manner that secondary electrons released from the active portions of these anodes are, for the most part, collected by the same anode structure whence they originate. In order to suppress secondary electron emission, it may be desirable to provide grounded elements (not shown) between anodes 25 and 26 and between these anodes and final anode 27, in a manner well known in the art.

Figure 2:
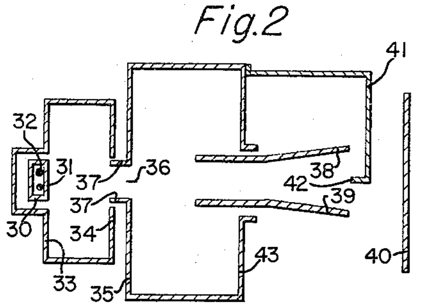

Figure 2 is a sectional view of a deflection-control electron-discharge device which may advantageously comprise an electron gun similar to that utilized in the device of Figure 1, comprising a cathode 30 having a substantially planar emitting surface 31 and provided with a heater element 32, an auxiliary electrode 33 having active portions substantially coplanar with surface 31, a focussing electrode 34, and an accelerating electrode 35 having an aperture 36 defined by a pair of opposed lips 37 extending toward cathode 30 and terminating at a distance from those boundaries of focussing electrode 34 nearest cathode 30 which is a small fraction of the width of aperture 36. A pair of electrostatic-deflection electrodes 38 and 39 are symmetrically arranged with respect to the path of the electron beam projected through aperture 36, and an output anode 40 is disposed across the path of an electron beam projected between deflection electrodes 38 and 39. An intercepting anode 41 having an intercepting edge 42 which is centrally disposed with respect to the path of an undeflected electron beam projected between deflection electrodes 38 and 39, is also provided. For structural convenience, intercepting anode 41 may be supported, as by welding or the like, by acelerating electrode 35, and a second accelerating electrode 43 may be provided for ease in combining the electrode systems of Figures 1 and 2 in a single unitary structure.

The arrangement of Figure 2 is a conventional deflection-control electron-discharge device, with the exception of the particular structure used for the electron gun. An electron beam projected through aperture 36 is deflected in accordance with a signal applied between deflection electrodes 38 and 39 so that the beam is periodically switched from output anode 40 to intercepting anode 41 and vice-versa. Thus, the output signal developed in the output circuit (not shown) associated with output anode 40 comprises essentially a square-wave voltage, in a manner well known in the art.

Figures 3, 4:
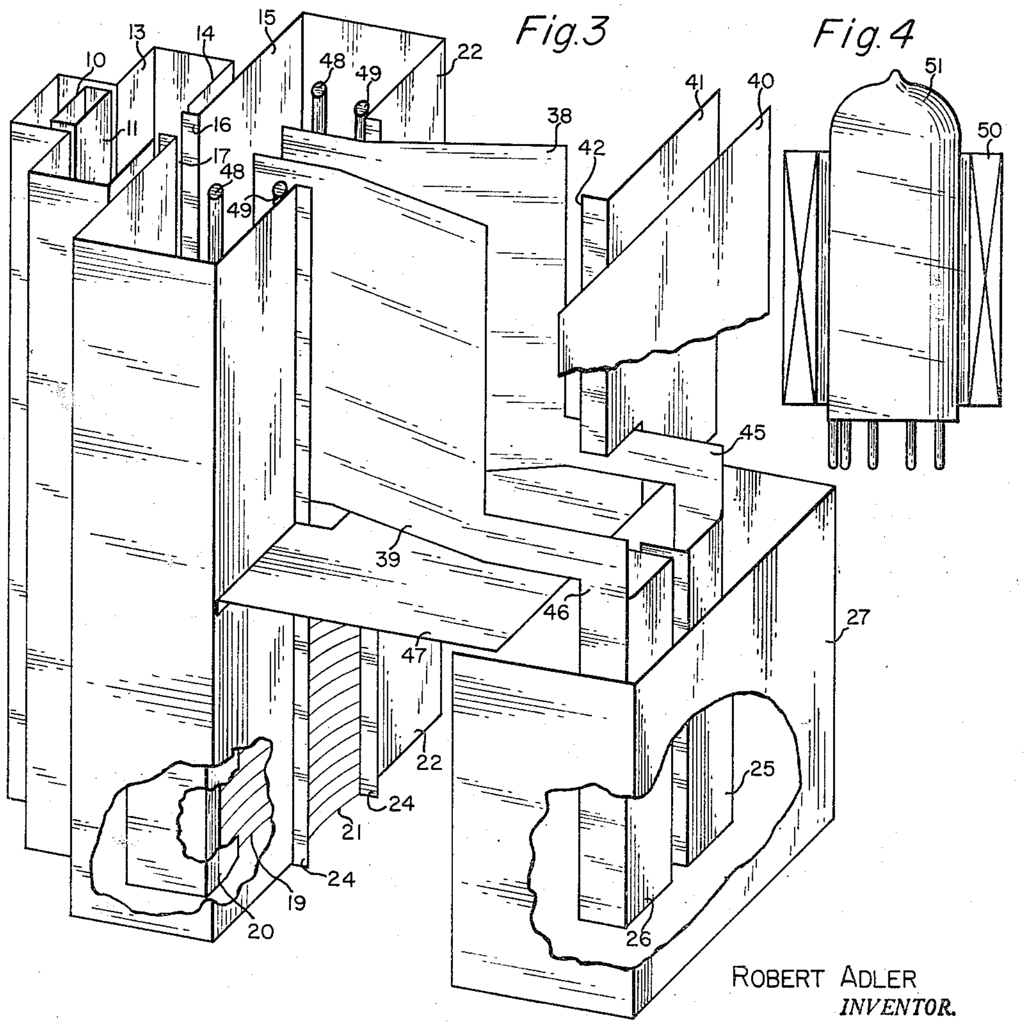
Figure 3 is a perspective view, partially cut away, of the electrode system of the novel and improved electron-discharge device shown in cross-section in Figures 1 and 2.
Figure 4 is a side view, partly in section, of the device of Figure 3 in cooperation with a magnetic-deflection coil.

Figure 3 is a perspective view, partially cut away, of the electrode arrangement of a novel electron-discharge device constructed in accordance with the present invention and combining the electrode systems of Figures 1 and 2 in a single unitary electrode structure. The device of Figure 3 comprises an electron gun including an elongated cathode 10 having an emissive surface 11 and an accelerating electrode 15 having a slot 17 parallel to cathode 10. A pair of electrode systems are disposed across the paths of different portions of the electron beam projected through slot 17 of first accelerating electrode 15. The lower system is similar to that shown in Figure 1 and comprises control grid 19, a convergent electron lens including focussing electrode 20 followed by screen grid 21, beam-directing member 22, and anodes 25, 26, and 27. The upper electrode system comprises electrostatic-deflection electrodes 38 and 39 as well as output anode 40 and intercepting anode 41.

Anodes 25 and 26 of the lower electrode system are electrically connected respectively to electrostatic-deflection electrodes 38 and 39 by means of connector strips 45 and 46; for ease of manufacture, each of the deflection plates and its associated anode may be formed from a single flat metal stamping which is then formed to the desired configuration.

Intercepting anode 41 is preferably welded or otherwise secured to second accelerating electrode 22 in such a manner as to form an effective shield between the two electrode systems; to this end, intercepting anode 41 comprises a shield portion 47 extending beneath the deflection electrodes 38 and 39 transversely of the tube and secured to accelerating electrode 22. Preferably, for reasons hereinafter to be made apparent, all of the electrodes following beam-directing member 22 and comprising deflection electrodes 38 and 39, output anode 40, intercepting anode 41, and anodes 25, 26, and 27, are constructed of non-magnetic material.

The complete electrode structure is supported within an envelope (not shown) by any suitable arrangement known in the art, as by means of a pair of mica spacer-discs, and the envelope is then evacuated and gettered in the usual fashion. External circuit connections are provided for cathode 10, the accelerator box comprising accelerating electrode 15 and beam-directing member 22 (to which screen grid 21 is connected), deflection electrode 38 and anode 25, deflection electrode 39 and anode 26, output anode 40, control grid 19, and final anode 27; in addition, a pair of external connections are provided for the heater element associated with cathode 10, not shown in Figure 3 to avoid confusing the drawing.

Focussing electrodes 14, 18 and 20 and auxiliary electrode 13 may conveniently be electrically connected internally to cathode 10 and thereby operated at cathode potential, and screen grid 21 may be secured to the accelerator box for operation at a common potential therewith. The support rods 48 for control grid 19 and rods 49 for screen grid 21 may be extended through the upper electrode system for mounting convenience. Optionally, the focussing electrode structure comprising second and third focussing electrodes 18 and 20 may also be extended for the full length of the electrode structure (not shown). Moreover, it may be possible to obtain satisfactory operation by omitting beam-directing member 22.

With reference to Figure 4, a magnetic-deflection coil 50 is arranged externally of the envelope 51 in which the electrode structure of Figure 3 is supported, in order to provide a deflection field within the device in a direction substantially parallel to cathode 10, thereby providing a means for transversely deflecting the electron beam. Transverse deflection of the beam, however, may be accomplished by any other means known to the art.

An electron-discharge device constructed in accordance with the foregoing specifications is particularly, although not exclusively, useful in synchronizing-control systems for television receivers or the like. A television receiver incorporating a synchronizing-control system utilizing the novel device provided by the present invention is illustrated schematically in Figure 5.

Figure 5:
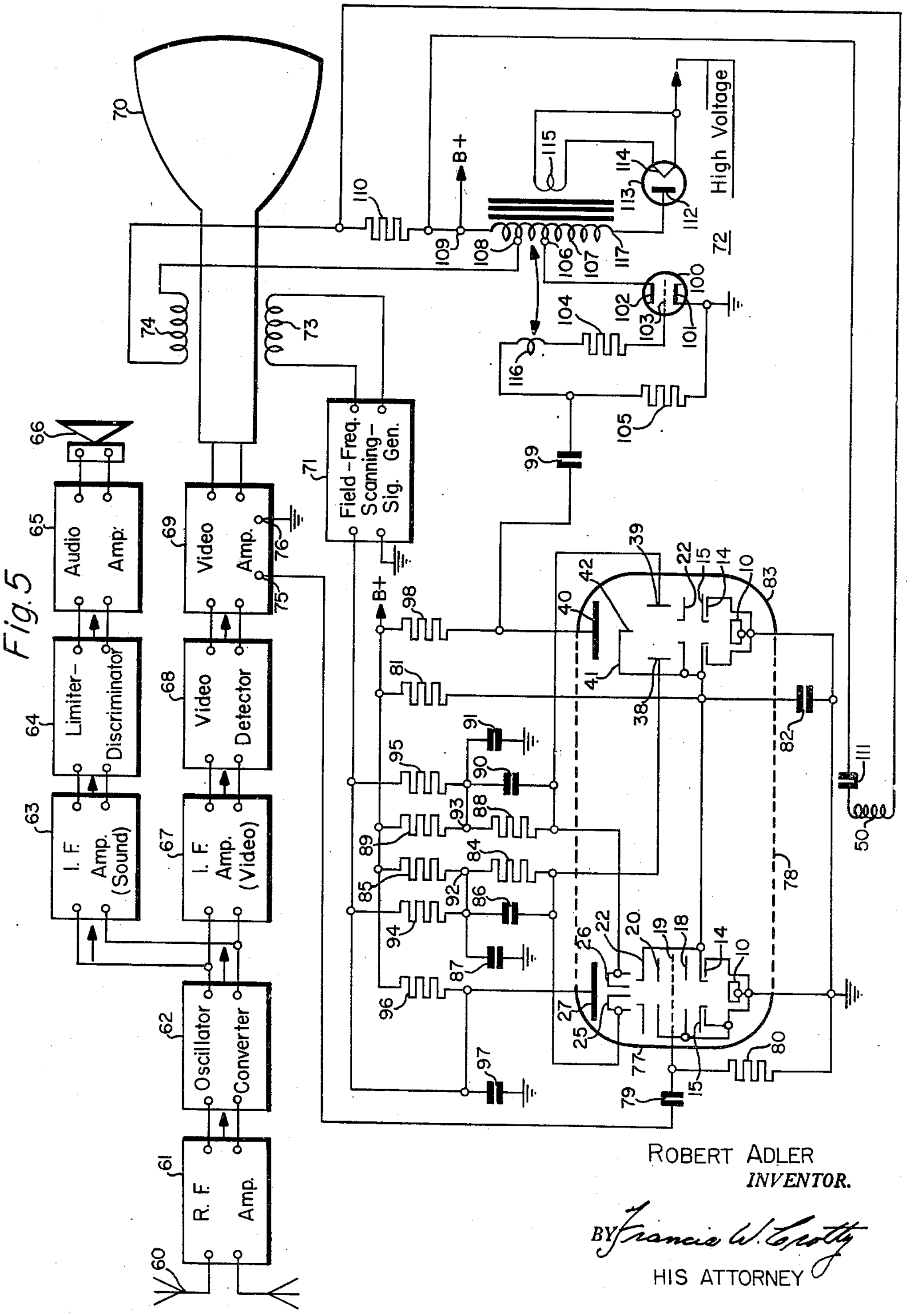
Figure 5 is a schematic circuit diagram of a television receiver embodying an electron-discharge device constructed in accordance with the invention.

In Figure 5, incoming composite television signals are intercepted by an antenna 60, selected and amplified by a radio-frequency amplifier 61 comprising any desired number of stages, and applied to an oscillator-converter 62 for heterodyning with a locally generated signal. Intermediate-frequency sound signals from oscillator-converter 62 are amplified by any desired number of stages 63 of intermediate-frequency amplification, and the amplified sound signals are limited and detected by means of a limiter-discriminator 64. Audio-frequency output from limiter-discriminator 64 is amplified by means of an audio amplifier 65 and applied to a loud speaker 66 or other sound-reproducing device.

Intermediate-frequency video signals from oscillator-converter 62 are amplified by any desired number of stages 67 of intermediate-frequency video amplification and are applied to a video-detector 68. Detected composite video signals from video detector 68 are applied to a video amplifier 69 and thence to the input circuit of a cathode-ray tube 70 or other image-reproducing device.

Alternatively, an intercarrier sound system may be used, in which event intermediate-frequency amplification of both video and sound signals may be accomplished in a single channel.

In order to insure receiver synchronization, there is also provided synchronizing-control apparatus including a field-frequency scanning-signal generator 71 and a line-frequency scanning-signal generator 72. Field-frequency scanning signals from generator 71 and line-frequency scanning signals from generator 72 are applied to the appropriate deflection coils, 73 and and 74 respectively, associated with image-reproducing device 70.

In conventional television receivers, proper synchronization of the field-frequency and line-frequency scanning-signal generators is accomplished by means of a synchronizing chain, comprising a synchronizing-signal separator, an automatic - frequency - control phase - detector, and a reactance-tube or other frequency-control device, responsive to the synchronizing-signal components of the detected composite video signal for synchronizing the frequency and phase of the respective scanning-signal generators; in conventional receivers, these functions are accomplished by means of relatively complex circuit arrangements including at least three electron-discharge devices. These functions, however, may all be accomplished with a relatively simple circuit using a single electron-discharge device of the type shown and described in connection with Figures 1–4.

To this end, detected composite video signals comprising positive-polarity line-frequency and field-frequency synchronizing-signal components are applied from terminals 75 and 76 of video amplifier 69, by means of a coupling condenser 79 and a grid resistor 80, between the control grid 19 and the cathode 10 of the lower section 77 of an electron-discharge device 78 of the type shown in Figure 3. Cathode 10 is directly connected to ground, and focussing electrodes 14, 18, and 20 are internally connected to cathode 10. Accelerating electrodes 15 and 22 are connected to a suitable source of positive unidirectional operating potential, conventionally designated B+, by means of a resistor 81, and are bypassed to ground by a condenser 82. Anode 25 is connected (preferably internally) to deflection electrode 38 of the upper section 83 of device 78 and is also connected to B+ through a pair of serially connected resistors 84 and 85; a condenser 86 is connected in parallel with resistor 84, and another condenser 87 is connected between the junction 92 of resistors 84 and 85 and ground. Similarly, anode 26 is connected (preferably internally) to deflection electrode 39 and is also connected to B+ through a pair of serially connected resistors 88 and 89; a condenser 90 is connected in parallel with resistor 88, and another condenser 91 is connected between the junction 93 of resistors 88 and 89 and ground. Junctions 92 and 93 are connected to final anode 27 by means of resistors 94 and 95 respectively. Final anode 27 is connected to B+ through an output load resistor 96 and is coupled to field-frequency scanning-signal generator 71; an integrating condenser 97 is connected between final anode 27 and ground.

In the upper section 83 of device 78, intercepting anode 41 is internally connected to accelerating electrodes 15 and 22. Output anode 40 is connected through an output load resistor 98 to B+ and is coupled to line-frequency scanning-signal generator 72 by means of a differentiating network including a coupling condenser 99 and an input resistor 105.

Line-frequency scanning-signal generator 72 may conveniently comprise a bidirectional electron-discharge device 100, constructed in accordance with the copending application of Robert Adler, Serial No. 129,554, filed November 26, 1949 for Electron-Discharge Device and Circuits, and assigned to the present assignee. Such a device comprises a pair of thermionic cathodes 101 and 102 with a control grid 103 intermediate the cathodes to control electron space current flow within the device. One of the cathodes 101 is directly connected to ground, and control grid 103 is coupled to cathode 101 by means of a series input circuit comprising a current-limiting resistor 104, a feedback coil 116 inductively coupled to coil 107, and input resistor 105. The other cathode 102 is connected to a tap 106 on an output inductor 107, and one terminal 109 of coil 107 is connected to B+. Line-frequency deflection coil 74 associated with image-reproducing device 70 is coupled between terminal 109 of coil 107 and a second tap 108 on that coil intermediate tap 106 and B+, and a small resistor 110 is included in series with deflection coil 74. The voltage developed across resistor 110 is applied to the series combination of magnetic-deflection coil 50 associated with device 78 and a tuning and phasing condenser 111 adjusted to resonate with coil 50 at the line-frequency.

Briefly, the operation of line-frequency scanning-signal generator 72 is as follows: At the beginning of each scanning-cycle, cathode 102 is at a lower potential than grounded cathode 101, and negative current flows through the output coil 107. The potential of cathode 102 rises uniformly at a rate determined by the ratio of the supply voltage to the inductance of the portion of coil 107 between B+ and tap 106 until, slightly before the middle of the scanning-cycle, the potential of cathode 102 becomes positive with respect to ground. Current-flow in device 100 is then reversed, and the potential of cathode 102 continues to rise at the same rate until a negative-polarity pulse is applied to the input circuit to render device 100 non-conductive. During the non-conductive period, a large positive-polarity pulse is produced between cathode 102 and ground. Feedback coil 116 operates to apply a proportional negative-polarity pulse to the input circuit, thereby effectively reducing the required amplitude of the trigger pulse.

If the feedback voltage ratio between tickler-coil 116 and output coil 107 is made materially greater than the reciprocal of the effective transconductance of control grid 103 with respect to ungrounded cathode 102, the circuit becomes self-sustaining, and trigger pulses of reduced amplitude and duration may be used to synchronize the scanning-signal generator. Such a self-sustaining arrangement is disclosed and claimed in the copending application of Jack E. Bridges, Serial No. 129,671, filed November 26, 1949, for Self-Sustaining Sawtooth Current Generators, now U. S. Patent No. 2,591,914 dated April 8, 1952, and assigned to the same assignee as the present application.

In order to provide high voltage for operating image-reproducing device 70, the second terminal 117 of coil 107 is connected to the anode 112 of a rectifier device 113, the filament 114 of which may be energized by means of a secondary winding 115 inductively coupled to output coil 107, in a manner well known in the art.

In operation, detected composite video signals, comprising positive-polarity line-frequency and field-frequency synchronizing-signal pulses, are applied to the control grid circuit of the lower section 77 of device 78 by circuit means comprising coupling condenser 79 and grid resistor 80. In order to provide synchronizing-signal slicing, or double clipping, the time-constant of the input circuit comprising condenser 79 and resistor 80 is preferably made at least as long as the period of the field-frequency. Since the control characteristic of control grid 19 is of the form of a step function, comprising two input-voltage ranges of substantially zero transconductance separated by an input-voltage range of high transconductance, the control grid 19 allows the lower portion of the sheet-like electron beam to pass only when the control grid potential is more positive than a predetermined minimum; in other words, control grid 19 operates as a beam gate. With an input circuit of an appropriate time constant, grid 19 is self-biased by the flow of grid current during synchronizing-signal pulse intervals. Because the grid current characteristic is limited as a result of the construction of the control system comprising accelerating electrode 15 and control grid 19, only intermediate portions of the synchronizing-signal pulses are reproduced in the electron beam passed by control grid 19.

This operation is explained in detail in the copending application of Erwin M. Roschke et al., Serial No. 94,642, filed May 21, 1949, for Signal-Slicing Circuits, and assigned to the present assignee.

If it is now assumed that the signal applied to magnetic-deflection coil 50 associated with device 78 is so phased as to pass through zero at exactly the instants when the line-frequency synchronizing-signal pulses occur, the beam passed by control grid 19 during line-frequency synchronizing-signal pulse intervals is undeflected and is divided equally between anodes 25 and 26; consequently, the output voltages developed in the respective output circuits associated with anodes 25 and 26 are equal when the magnetic scanning-signal is properly phased with respect to the incoming line-frequency synchronizing-signal pulses.

At the same time, the portion of the sheet-like beam projected from the electron gun in the upper section 83 of device 78 is periodically deflected in a lateral direction due to the alternating magnetic deflection field set up by coil 50. Thus, a negative pulse is developed across resistor 105 each time the beam is switched from intercepting anode 41 to output anode 40, and a positive pulse is developed across resistor 105 each time the beam on its return swing is switched from output anode 40 to intercepting anode 41. If, as already assumed, the deflection signal applied to coil 50 is so phased as to pass through zero at exactly the instants when the line-frequency synchronizing-signal pulses occur, and if the coil 50 is so oriented with respect to device 78 as to switch the electron beam in the upper section from intercepting anode 41 to output anode 40 at these instants, negative polarity pulses are produced across resistor 105 in synchronism with the line-frequency synchronizing-signal pulses. These sharp potental drops are utilized to trigger the line-frequency scanning-signal generator 72 and for this purpose are coupled to the input circuit of device 100 by means of condenser 99 and resistor 105 which are of such respective magnitudes as to provide a time constant which is short relative to the period of the line-frequency, thereby to provide a differentiating action.

If the deflection signal across coil 50 is not properly phased with respect to the incoming line-frequency synchronizing-signal pulses, the phase of the output signal appearing across resistor 98 is automatically shifted by an amount proportional to the deviation from synchronism and in a direction to restore synchronism.

For example, the incoming line-frequency synchronizing-signal pulses may instantaneously lag the deflection signal applied to coil 50. If it is assumed that the polarity of the signal applied to coil 50 is such as to cause the sheet-like beam of device 78 to switch from intercepting anode 41 to output anode 40 (i. e. if the deflection signal swings through zero at approximately the moment when the line-frequency synchronizing-signal pulse is expected), a larger portion of the beam passed by control grid 19 during the synchronizing-pulse interval is collected by anode 26 than by anode 25. Consequently, the potential of anode 26 is decreased relative to that of anode 25. As a result, the electrostatic deflection-field set up between deflection electrodes 38 and 39, which are direct-coupled to anodes 25 and 26 respectively, opposes the magnetic deflection-field established by coil 50 and retards the lateral deflection from left to right of the beam in the upper section 83 of device 78. Therefore, during the cycle under consideration, the switching of the beam from intercepting anode 41 to output anode 40 is retarded, and the negative-polarity pulse developed across resistor 105 is maintained in phase with the incoming line-frequency synchronizing-signal pulse.

On the other hand, if the line-frequency synchronizing-signal pulses instantaneously lead the deflection signal applied to coil 50, the potential of anode 25 is reduced relative to that of anode 26, and the electrostatic deflection-field set up between deflection electrodes 38 and 39 is in such a direction as to aid the lateral deflection of the beam in the upper section 83 and advance the negative-polarity pulse appearing across resistor 105. Thus, phase deviations of the deflection signal applied to coil 50 relative to the incoming line-frequency synchronizing-signal pulses are compensated.

Thus, the lower section 77 of device 78 effectively performs the functions of synchronizing-signal separation and balanced automatic-frequency-control phase-detection. Any deviation from exact phase synchronism between the incoming line-frequency synchronizing-signal pulses and the scanning signals developed by generator 72 is reflected in an unbalance between the potentials of anodes 25 and 26. This potential unbalance is transferred by direct-coupling to electrostatic-deflection electrodes 38 and 39 in such a sense as to advance or retard the negative-polarity output pulses appearing across resistor 105 by an amount just sufficient to compensate for the original phase difference. Consequently, the line-frequency scanning-signal generator 72 is triggered at exactly the proper moment to maintain the receiver scanning in synchronism with that at the transmitter.

In order to prevent loss of synchronization and "tearing out" in the event that the incoming line-frequency synchronizing-signal pulses are momentarily over-ridden by extraneous noise signals, the output circuit associated with anodes 25 and 26, comprising resistor 85 and condenser 87 in the one instance and resistor 89 and condenser 91 in the other, are each chosen to provide a time-constant of several line intervals; for example, the time constant may be chosen to be approximately equal to 100 line intervals. As in conventional automatic-frequency-control arrangements, however, the integrating action of the output circuits must be restricted sufficiently to enable the line-frequency scanning-signal generator initially to lock in with the incoming line-frequency synchronizing-signal pulses when the receiver is first set into operation.

Condensers 86 and 90 are provided to bypass alternating components of the balanced direct-voltage control signal applied between deflection electrodes 38 and 39; alternatively, a single condenser (not shown) may be connected between deflection electrodes 38 and 39 for this purpose. Because the balanced automatic-frequency-control signal is utilized by applying it between a pair of electrostatic-deflection electrodes, this signal may be direct-coupled to the deflection plates; no blocking condensers are needed because a balanced electrostatic-deflection system operates most efficiently when equal positive-biasing voltages are applied to the electrostatic-deflection electrodes.

Since the time constant of the input circuit comprising condenser 79 and resistor 80 is preferably made at least as long as the period of the field-frequency, field-frequency synchronizing-signal pulses are also subjected to a slicing action, and intermediate portions of these pulses produce constant-amplitude negative-polarity pulses across output load resistor 96. These pulses may be integrated by means of condenser 97 and applied to field-frequency scanning-signal generator 71 to maintain proper field-frequency scanning synchronism of the receiver with respect to the transmitter. It is noted that two portions of each line interval of the field-frequency synchronizing-signal pulses are not reproduced in the output signal developed across resistor 96 because the beam is momentarily intercepted by anodes 25 and 26 as it is swept across these anodes by magnetic deflection coil 50. By making anodes 25 and 26 symmetrical with respect to the path of the undeflected electron beam passed by control grid 19, it is insured that these discontinuities in the field-frequency output pulses will have no adverse effect upon the receiver scanning interlace. However, in the system of Figure 5, discontinuities in the field-frequency pulses used to drive field-frequency scanning-signal generator 71 are avoided by means of resistors 94 and 95 which are connected in such a manner as effectively to add the outputs of anodes 25 and 26 to that of anode 27 to obtain the field-frequency output pulses.

It is also possible to obtain field-frequency output pulses directly from the balanced control signal anodes by making these anodes of sufficient lateral extent to accommodate the entire lateral deflection of the beam by the deflection signal applied to coil 50. Such an arrangement obviates the requirement for a separate collector anode; however, it is preferred to use the additional anode in conjunction with narrow control signal anodes because of the noise gating obtained thereby in a manner to be hereinafter explained.

With the output current from line-frequency scanning-signal generator 72 providing the magnetic deflection for the upper section 83 of device 78, and with the output anode 40 of that section providing trigger pulses for the line-frequency scanning-signal generator 72, a feedback loop is established for providing self-sustaining scanning-signal oscillations. Consequently, scanning-signal generator 72 may be either of the self-sustaining type disclosed and claimed in the Bridges application or of the non-self-sustaining type disclosed and claimed in Adler application Serial No. 129,554. Preferably, however, to insure the start of oscillation around the feedback loop, generator 72 is of the self-sustaining variety.

It is also possible to utilize a conventional discharge-tube scanning-signal generator in conjunction with the synchronizing-control apparatus incorporating device 78; however, when such a conventional discharge-tube generator is used, the direction of the magnetic field produced by coil 50 must be reversed since positive-polarity pulses are required to trigger the scanning-signal generator.

In the illustrated embodiment, it is convenient to provide lateral deflection of the sheet-like electron beam by using an external magnetic-deflection coil 50 which is responsive to the line-frequency scanning signals to operate as a deflection-control device. Consequently, in order to obtain the maximum magnetic deflection for a given field strength, it is preferred to construct all of the electrodes following the second accelerating electrode 22 of non-magnetic material. The material of which the electron gun and the intensity-control system are constructed may be either magnetic or non-magnetic, since deflection in this portion of the device is relatively unimportant.

While the system of Figure 5 utilizes a tapped portion of the output signal from the scanning-signal generator 72 to drive the deflection-control device 50, it is apparent that any other signal in synchronism with the line-frequency scanning-signals may be used for this purpose. In practice, a deflection field of the order of 10 gauss is required to provide sufficient lateral deflection of the electron beam; this corresponds to less than 1% of the energy used by the line-frequency deflection coils 74 in the yoke associated with image-reproducing device 70.

Thus, an electron-discharge device constructed in accordance with the present invention affords great advantage in its application as a synchronizing-control device for use in a television receiver. The functions of synchronizing-signal separation, automatic-frequency control phase-detection, and frequency-control of the line-frequency scanning-signal generator are all accomplished with a single electron-discharge device and a minimum number of associated circuit components.

In addition, there is a further advantage afforded by the use of the device shown in Figure 3. While the control grid 19 operates to pass selected intermediate portions of the incoming synchronizing-signal pulses, extraneous noise pulses of sufficient amplitude to extend into the blacker-than-black region between adjacent synchronizing-signal pulses are also passed. However, these extraneous noise signals do not contribute materially to the output of the balanced phase-detector, since electrons passed by control grid 19 during intervals between adjacent synchronizing-signal pulses are all collected by collector anode 27 except during two small portions of each line-frequency cycle, due to the action of deflection-control device 50. Consequently, a substantial amount of noise gating is accomplished in addition to the other functions listed; while it is known to provide gating per se, this function has always been accomplished in prior art receivers at the expense of an additional number of circuit components.

Figures 6, 7:
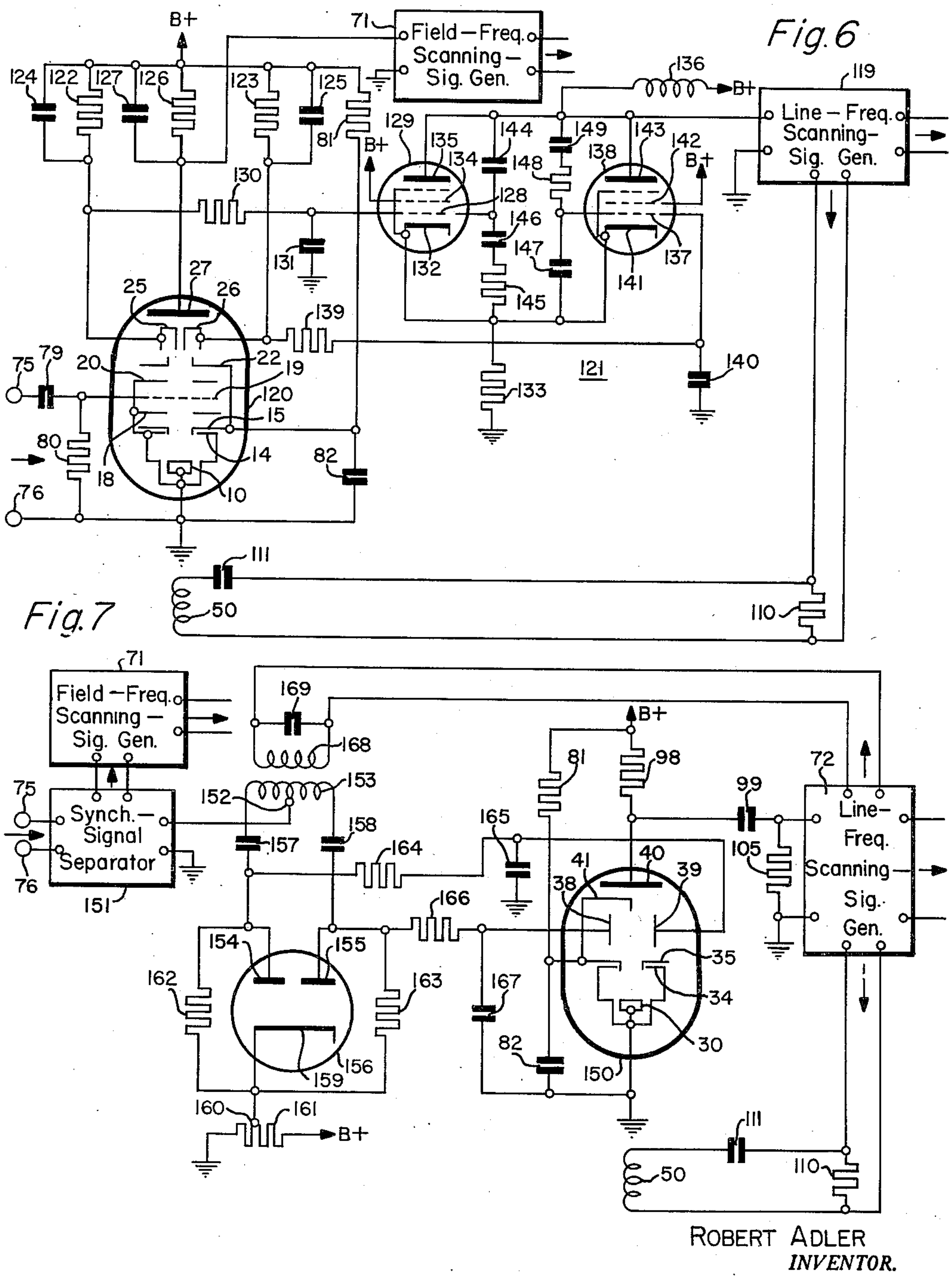
Figures 6 and 7 are schematic circuit diagrams of other arrangements embodying electron-discharge devices constructed in accordance with the invention.

While it is preferred to utilize a structure of the type shown in Figure 3 as a synchronizing-control device in a television receiver, the lower section of the device, shown in cross-section in Figure 1, is also new and useful in itself. An arrangement for utilizing an electron-discharge device of this type is illustrated in Figure 6, which is a schematic representation of the synchronizing chain of a television receiver. The arrangement comprises an electron-discharge device 120 of the type shown in cross-section in Figure 1 in combination with a push-pull reactance-tube system 121, a field-frequency scanning-signal generator 71, and a line-frequency scanning-signal generator 119 of conventional construction. Terminal 75 of video amplifier 69 (Figure 5) is coupled to control grid 19 by means of a coupling condenser 79, and terminal 76 of video amplifier 69 is directly connected to the grounded cathode 10. A grid resistor 80 is connected between control grid 19 and ground. Accelerating electrodes 15 and 22 are connected to B+ through a resistor 81 and are bypassed to ground by means of a condenser 82.

Separate output circuits are provided for anodes 25, 26, and 27. The output circuits for anodes 25 and 26 are balanced and comprise resistors 122 and 123 respectively; condensers 124 and 125 are respectively connected in parallel with resistors 122 and 123. Collector anode 27 is coupled to B+ through an output circuit comprising the parallel combination of a resistor 126 and a condenser 127, and anode 27 is direct-coupled to field-frequency scanning-signal generator 71.

Anode 25 is coupled to the control grid 128 of an electron-discharge device 129 by means of an integrating network comprising a series resistor 130 and a shunt condenser 131. The cathode 132 of device 129 is connected to ground through a resistor 133, and the screen grid 134 of device 129 is directly connected to B+. The anode 135 of device 129 is coupled to B+ through a choke coil 136.

Anode 26 of device 120 is coupled to the control grid 137 of another electron-discharge device 138 by means of an integrating network comprising a series resistor 139 and a shunt condenser 140. The cathode 141 of device 138 is connected to cathode 132 of device 129, and the screen grid 142 of device 138 is directly connected to B+. The anode 143 of device 138 is connected to B+ through choke coil 136.

In order to provide balanced reactance-tube operation of devices 129 and 138 in response to the balanced direct-voltage control signal appearing between anodes 25 and 26, a condenser 144 is connected between the anode 135 and the control grid 128 of device 129, and the series combination of a resistor 145 and a blocking condenser 146 is connected between control grid 128 and cathode 132. Similarly a condenser 147 is connected between control grid 137 and cathode 141 of device 138, and the series combination of a resistor 148 and a blocking condenser 149 is coupled between anode 143 and control grid 137. Anodes 135 and 143 are coupled to line-frequency scanning-signal generator 119.

Line-frequency scanning signals developed by generator 119 are applied to the line-frequency deflection coil associated with the image-reproducing device (not shown), and a portion of the line-frequency scanning signals is tapped out by means of a small resistor 110 and applied to the series combination of deflection-control device 50 and tuning and phasing condenser 111.

The operation of electron-discharge device 120 and its associated circuit components is similar in all essential respects to that of the lower section of device 78 in the system of Figure 5. Thus, field-frequency pulses are developed across resistor 126 and are applied to field-frequency scanning-signal generator 71 after integration by means of condenser 127. In addition, output signals are developed at anodes 25 and 26, and these output signals are equal whenever the line-frequency scanning-signal generator 119 is properly phased with respect to the incoming line-frequency synchronizing-signal pulses. However, a balanced direct-voltage control signal appears between anodes 25 and 26 whenever the line-frequency scanning-signal generator 119 falls out of step with the incoming synchronizing-signal pulses.

Devices 129 and 138 and their associated circuit components function as a balanced or push-pull reactance-tube system for utilizing the control signal developed between anodes 25 and 26 to maintain the line-frequency scanning-signal generator 119 in phase with the line-frequency synchronizing-signal pulses appearing between terminals 75 and 76. When the system is balanced, device 129 operates as an inductive reactance, and device 138 as a capacitive reactance equal in magnitude and opposite in phase to the effective reactance of device 129. Consequently, when the scanning-signal generator is properly synchronized, the net output from reactance-tube system 121 is zero. However, when a condition of unbalance exists, a net inductive or capacitive effect is produced by system 121 of proper magnitude and sense to restore synchronism of the scanning-signal generator.

In the embodiment of Figure 7, synchronizing-signal separation and automatic-frequency-control phase-detection are accomplished by using conventional devices, whereas the frequency-control of the line-frequency scanning-signal generator is accomplished by the use of a device 150 of the general type shown in cross-section in Figure 2.

Terminals 75 and 76 of video amplifier 69 (Figure 5) are coupled to a synchronizing-signal separator 151 which may be of conventional construction. Field-frequency synchronizing-signal pulses from synchronizing-signal separator 151 are applied to the field-frequency scanning-signal generator 71, and the output scanning signals from generator 71 are impressed upon the field-frequency deflection coils (not shown) associated with the image-reproducing device.

Line-frequency synchronizing-signal pulses from synchronizing-signal separator 151 are applied to a center tap 152 on a coil 153, the terminals of which are respectively connected to the anodes 154 and 155 of a double-diode rectifier device 156 by means of blocking condensers 157 and 158. The cathode 159 of device 156 is connected to a tap 160 on a bleeder resistor 161 connected between B+ and ground. Balanced load resistors 162 and 163 are connected respectively from anode 154 and from anode 155 to cathode 159.

Anode 154 of device 156 is coupled to deflection electrode 39 of device 150 by means of an integrating network comprising a series resistor 164 and a shunt condenser 165. Similarly, anode 155 of device 156 is coupled to deflection electrode 38 of device 150 by means of a series resistor 166 and a shunt condenser 167. The cathode 30 of device 150 is grounded, and accelerating electrode 35 is connected to B+ through a resistor 81 and to ground through a condenser 82. Intercepting anode 41 is connected to accelerating electrode 35, and output anode 40 is connected to B+ through a load resistor 98. Output anode 40 is also coupled to the line-frequency scanning-signal generator 72 by means of a differentiating network comprising a coupling condenser 99 and an input resistor 105.

Line-frequency scanning signals, or a signal in synchronism therewith, are applied from generator 72 to a parallel-resonant circuit comprising an inductor 168 and a condenser 169, and inductor 168 is inductively coupled to coil 153. Line-frequency scanning signals are also tapped from a small resistor 110 and applied to the series combination of deflection-control device 50 and tuning and phasing condenser 111 to provide periodic lateral deflection of the electron beam within device 150. Line-frequency scanning signals from generator 72 are applied to the line-frequency deflection coil (not shown) associated with the image-reproducing device.

In operation, device 156 and its associated circuit components comprise a balanced automatic-frequency-control phase-detector for comparing the phase of the line-frequency synchronizing-signal pulses with that of the line-frequency scanning signals impressed across coil 168. For a condition of balance, representing exact phase synchronism, the direct-voltage signals appearing across resistors 162 and 163 are equal, and therefore no direct-voltage control potential difference appears between electrostatic-deflection electrodes 38 and 39 of device 150. The beam within device 150 is periodically deflected in a lateral direction in response to the alternating magnetic field established by magnetic-deflection coil 50 within device 150, so that periodic output pulses appear across resistor 98 as explained in connection with Figure 5. These pulses are differentiated by condenser 99 and resistor 105 and are used to trigger the line-frequency scanning-signal generator 72. Either positive-polarity or negative-polarity output pulses may be used to trigger the scanning-signal generator depending on the construction of the generator; for some conventional scanning-signal generators, positive trigger pulses are required, whereas negative trigger pulses may be used to drive a scanning generator of the type illustrated in Figure 5. The polarity of the output pulses in synchronism with the line-frequency synchronizing-signal pulses is determined by the orientation of coil 50 with respect to device 150; the polarity may be reversed by interchanging the terminal connections of coil 50.

In the embodiment of Figure 7, it is also possible to provide periodic lateral deflection of the electron beam within device 150 by applying a sinusoidal signal in synchronism with the line-frequency scanning signals between deflection electrodes 38 and 39, thereby obviating the requirement for an external magnetic deflection coil. All that is essential is that a deflection field be established within device 150 in a direction perpendicular to the direction of electron travel, thereby to provide periodic lateral deflection of the beam and periodically to switch the beam from intercepting anode 41 to output anode 40 and vice-versa.

In the illustrated embodiments, trigger pulses for driving the line-frequency scanning-signal generator are derived from an output circuit coupled to output anode 40, and intercepting anode 41 is operated at the same potential as the accelerating electrodes. However, it is apparent that intercepting anode 41 may be maintained electrically independent of the accelerating electrodes, if desired, so that output pulses of polarity opposite to that of the pulses appearing across resistor 105 may be provided across a differentiating load circuit coupled to intercepting anode 41 (not shown).

The synchronizing-control systems shown and described in connection with Figures 5, 6, and 7 are specifically claimed in the copending applications of Robert Adler, Serial No. 139,402 filed concurrently herewith, for Synchronizing-Control Apparatus, Serial No. 260,221, filed December 6, 1951, for Synchronizing Control Apparatus, and Serial No. 267,826, filed January 23, 1952, for Frequency Controllable Oscillating Systems, all assigned to the present assignee. Other features of the tube construction are also claimed in the copending application of Robert Adler, Serial No. 139,403, filed concurrently herewith, for Deflection-Control Electron-Discharge Devices, which is also assigned to the present assignee.

Thus, the invention provides a novel electron-discharge device which is particularly useful in a synchronizing-control system for a television receiver by virtue of the fact that all of the functions accomplished by three or more separate tubes in present-day receivers may be accomplished with a single-electron discharge device constructed in accordance with the present invention in cooperation with a reduced number of associated circuit components. Other applications for the novel tube structure provided by the invention may occur to those skilled in the art.

While the invention has been shown and described in connection with certain preferred embodiments thereof, it is apparent that numerous variations and modifications may be made, and it is contemplated in the appended claims to cover all such variations and modifications as fall within the true spirit and scope of the invention.

I claim:

1. An electron-discharge device comprising an electron gun for projecting a focussed electron beam; a control system including an accelerating electrode having an aperture registering with said beam followed by a control grid; a convergent electron lens for refocussing electrons passed by said control grid; and a pair of anodes respectively having active portions on opposite sides of the path of an undeflected electron beam emerging from said electron lens.

2. An electron-discharge device comprising an electron gun for projecting a focussed electron beam; a control system including an accelerating electrode having an aperture registering with said beam followed by a control grid; a convergent electron lens for refocussing electrons passed by said control grid; and a pair of anodes constructed of non-magnetic material and respectively having active portions on opposite sides of the path of an undeflected electron beam emerging from said electron lens.

3. An electron-discharge device comprising: an electron gun for projecting a focussed electron beam; a control system including an accelerating electrode having an aperture registering with said beam followed by a control grid; a convergent electron lens for refocussing electrons passed by said control grid; and a pair of anodes positioned symmetrically with respect to the path of an undeflected electron beam emerging from said electron lens.

4. An electron-discharge device comprising: an electron gun for projecting a sheet-like electron beam of substantially rectangular cross-section; a control system comprising an accelerating electrode included in said electron gun and having a slot registering with said beam followed by a control grid at a distance from said accelerating electrode greater than the smallest transverse dimension of said slot; a convergent electron lens for refocussing electrons passed by said control grid; and a pair of anodes positioned symmetrically with respect to the path of an undeflected electron beam emerging from said electron lens.

5. An electron-discharge device comprising: an electron gun for projecting a sheet-like electron beam of substantially rectangular cross-section; a control system comprising an accelerating electrode included in said electron gun and having a slot registering with said beam followed by a control grid at a distance from said accelerating electrode greater than the smallest transverse dimension of said slot; a convergent electron lens for refocussing electrons passed by said control grid; a pair of anodes respectively having active portions on opposite sides of the path of an undeflected electron beam emerging from said electron lens; and an additional anode for collecting space electrons not collected by said first-mentioned anodes.

6. An electron-discharge device comprising: an electron gun for projecting a sheet-like electron beam of substantially rectangular cross-section; a control system comprising an accelerating electrode included in said electron gun and having a slot registering with said beam followed by a control grid at a distance from said accelerating electrode greater than the smallest transverse dimension of said slot; a convergent electron lens for refocussing electrons passed by said control grid; a pair of anodes respectively having active portions on opposite sides of the path of an undeflected electron beam emerging from said electron lens; and deflection-control means for establishing a deflection field in a direction transverse to said path to sweep said emerging beam back and forth across said anodes in synchronism with a control signal.

7. An electron-discharge device comprising: an electron gun for projecting a sheet-like electron beam of substantially rectangular cross-section; a control system comprising an accelerating electrode included in said electron gun and having a slot registering with said beam followed by a control grid at a distance from said accelerating electrode greater than the smallest transverse dimension of said slot; a convergent electron lens for refocussing electrons passed by said control grid; a pair of anodes constructed of non-magnetic material and respectively having active portions on opposite sides of the path of an undeflected electron beam emerging from said electron lens; a magnetic-deflection coil responsive to a control signal for sweeping said emerging beam back and forth across said strip anodes; and an additional anode for collecting space electrons not collected by said first-mentioned anodes.

8. An electron-discharge device comprising: an electron gun, including an elongated cathode and an accelerating electrode having a slot, for projecting a sheet-like electron beam of substantially rectangular cross-section; a first electrode system disposed across the path of a portion of said electron beam and including a control grid, a convergent electron lens for refocussing electrons passed by said control grid, and a pair of anodes respectively having active portions on opposite sides of the path of an undeflected electron beam emerging from said electron lens; and a second electrode system arranged transversely of the path of another portion of said sheet-like beam and including a pair of electrostatic-deflection electrodes and a plurality of anodes disposed in such space relation with respect to said deflection plates that the portion of said sheet-like beam projected between said deflection electrodes is switched from one of said last-mentioned anodes to another upon lateral deflection thereof.

9. An electron-discharge device comprising: an electron gun, including an elongated cathode and an accelerating electrode having a slot, for projecting a sheet-like electron beam of substantially rectangular cross-section; a first electrode system disposed across the path of a portion of said electron beam and including a control grid spaced from said accelerating electrode at a distance greater than the smallest transverse dimension of said slot, a convergent electron lens for refocussing electrons passed by said control grid, and a pair of anodes respectively having active portions on opposite sides of the path of an undeflected electron beam emerging from said electron lens; and a second electrode system arranged transversely of the path of another portion of said sheet-like beam and including a pair of electrostatic-deflection electrodes, an output anode, and an intercepting anode for intercepting the portion of said sheet-like beam projected between said deflection electrodes upon deflection thereof in one direction from its undeflected path.

10. An electron-discharge device comprising: an electron gun, including an elongated cathode and an accelerating electrode having a slot, for projecting a sheet-like electron beam of substantially rectangular cross-section; a first electrode system disposed across the path of a portion of said electron beam and including a control grid spaced from said accelerating electrode at a distance greater than the smallest transverse dimension of said slot, a convergent electron lens for refocussing electrons passed by said control grid, and a pair of anodes respectively having active portions on opposite sides of the path of an undeflected electron beam emerging from said electron lens; and a second electrode system arranged transversely of the path of another portion of said sheet-like beam and comprising electrodes constructed of non-magnetic material including a pair of electrostatic-deflection electrodes, an output anode, and an intercepting anode for intercepting the portion of said sheet-like beam projected between said deflection electrodes upon deflection thereof in one direction from its undeflected path.

11. An electron-discharge device comprising: an electron gun, including an elongated cathode and an accelerating electrode having a slot, for projecting a sheet-like electron beam of substantially rectangular cross-section; a first electrode system disposed across the path of a portion of said electron beam and including a control grid spaced from said accelerating electrode at a distance greater than the smallest transverse dimension of said slot, a convergent electron lens for refocussing electrons passed by said control grid, and a pair of anodes respectively having active portions on opposite sides of the path of an undeflected electron beam emerging from said electron lens; and a second electrode system arranged transversely of the path of another portion of said sheet-like beam and including a pair of electrostatic-deflection electrodes electrically connected respectively to said pair of anodes, an output anode, and an intercepting anode for intercepting the portion of said sheet-like beam projected between said deflection electrodes upon deflection thereof in one direction from its undeflected path.

12. An electron-discharge device comprising: an electron gun, including an elongated cathode and an accelerating electrode having a slot, for projecting a sheet-like electron beam of substantially rectangular cross-section; a first electrode system disposed across the path of a portion of said electron beam and including a control grid spaced from said accelerating electrode at a distance greater than the smallest transverse dimension of said slot, a convergent electron lens for refocussing electrons passed by said control grid, and a pair of anodes respectively having active portions on opposite sides of the path of an undeflected electron beam emerging from said electron lens; a second electrode system arranged transversely of the path of another portion of said sheet-like beam and including a pair of electrostatic-deflection electrodes electrically connected respectively to said pair of anodes, an output anode, and an intercepting anode for intercepting the portion of said sheet-like beam projected between said deflection electrodes upon deflection thereof in one direction from its undeflected path; and a shield integral with said intercepting anode for effectively separating said electrode systems.

13. An electron-discharge device comprising: an electron gun, including an elongated cathode and an accelerating electrode having a slot, for projecting a sheet-like electron beam of substantially rectangular cross-section; a first electrode system disposed across the path of a portion of said electron beam and including a control grid spaced from said accelerating electrode at a distance greater than the smallest transverse dimension of said slot, a convergent electron lens for refocussing electrons passed by said control grid, and a pair of anodes respectively having active portions on opposite sides of the path of an undeflected electron beam emerging from said electron lens; and a second electrode system arranged transversely of the path of another portion of said sheet-like beam and including a pair of electrostatic-deflection electrodes, an output anode, and an intercepting anode having an intercepting edge which is centrally disposed with respect to the path of an undeflected electron beam projected between said deflection electrodes for intercepting said projected beam upon deflection thereof in one direction from said undeflected path.

14. An electron-discharge device comprising: an electron gun, including an elongated cathode and an accelerating electrode having a slot, for projecting a sheet-like electron beam of substantially rectangular cross-section; a first electrode system disposed across the path of a portion of said electron beam and including a control grid spaced from said accelerating electrode at a distance greater than the smallest transverse dimension of said slot, a convergent electron lens for refocussing electrons passed by said control grid, a second accelerating electrode having a slot registering with said beam, and a pair of anodes respectively having active portions on opposite sides of the path of an undeflected electron beam emerging from said last-mentioned slot; a second electrode system comprising electrodes arranged transversely of the path of another portion of said sheet-like beam and including a pair of electrostatic-deflection electrodes electrically connected respectively to said pair of anodes, an output anode, and an intercepting anode for intercepting the portion of said sheet-like beam projected between said deflection electrodes upon deflection thereof in one direction from its undeflected path; and deflection control means for establishing a deflection field in a direction transverse to at least one of said portions of said path for transversely deflecting the corresponding portion of said sheet-like beam in synchronism with a control signal.

15. An electron-discharge device comprising: an electron gun, including an elongated cathode and an accelerating electrode having a slot, for projecting a sheet-like electron beam of substantially rectangular cross-section; a first electrode system disposed across the path of a portion of said electron beam and including a control grid spaced from said accelerating electrode at a distance greater than the smallest transverse dimension of said slot, a convergent electron lens for refocussing electrons passed by said control grid, a second accelerating electrode having a slot registering with said beam, and a pair of anodes respectively having active portions on opposite sides of the path of an undeflected electron beam emerging from said last-mentioned slot; a second electrode system comprising electrodes arranged transversely of the path of another portion of said sheet-like beam and including a pair of electrostatic-deflection electrodes electrically connected respectively to said pair of anodes, an output anode, and an intercepting anode for intercepting the portion of said sheet-like beam projected between said deflection electrodes upon deflection thereof in one direction from its undeflected path; and deflection-control means for establishing a deflection field in a direction transverse to said path for transversely deflecting said sheet-like beam in synchronism with a control signal.

16. An electron-discharge device comprising: an electron gun, including an elongated cathode and an accelerating electrode having a slot, for projecting a sheet-like electron beam of substanstially rectangular cross-section; a first electrode system disposed across the path of a portion of said electron beam and including a control grid spaced from said accelerating electrode at a distance greater than the smallest transverse dimension of said slot, a convergent electron lens for refocussing electrons passed by said control grid, a second accelerating electrode having a slot registering with said beam, and a pair of anodes constructed of non-magnetic material and respectively having active portions on opposite sides of the path of an undeflected electron beam emerging from said last-mentioned slot; a second electrode system comprising electrodes constructed of non-magnetic material and arranged transversely of the path of another portion of said sheet-like beam and including a pair of electrostatic-deflection electrodes electrically connected to said anodes, an output anode, and an intercepting anode for intercepting the portion of said sheet-like beam projected between said deflection electrodes upon deflection thereof in one direction from its undeflected path; and a magnetic-deflection coil responsive to a control signal for transversely deflecting said sheet-like beam.

17. An electron-discharge device comprising: an electron gun having an elongated cathode for projecting a sheet-like electron beam of substantially rectangular cross-section; a first electrode system comprising an intensity-control grid followed by a pair of anodes respectively having active portions on opposite sides of the path of a transverse portion of said beam; and a second electrode system comprising a pair of electrostatic-deflection electrodes positioned on opposite sides of the path of another transverse portion of said beam.

18. An electron-discharge device comprising: an electron gun having an elongated cathode for projecting a sheet-like electron beam of substantially rectangular cross-section; a first electrode system comprising an intensity-control grid followed by a pair of anodes respectively having active portions on opposite sides of the path of a transverse portion of said beam; and a second electrode system comprising a pair of electrostatic-deflection electrodes positioned on opposite sides of the path of another transverse portion of said beam and electrically connected respectively to said anodes.

19. An electron-discharge device comprising: an electron gun having an elongated cathode for projecting a sheet-like electron beam of substantially rectangular cross-section; a first electrode system comprising an intensity-control grid followed by a pair of anodes constructed of non-magnetic material and respectively having active portions on opposite sides of the path of a transverse portion of said beam; and a second electrode system comprising electrodes constructed of non-magnetic material and including a pair of electrostatic-deflection electrodes positioned on opposite sides of the path of another transverse portion of said beam.

ROBERT ADLER.

REFERENCES CITED

The following references are of record in the file of this patent:

UNITED STATES PATENTS

| Number | Name | Date |
|---|---|---|
| 2,139,678 | Glass | Dec. 13, 1938 |
| 2,259,099 | Bernamont | Oct. 14, 1941 |
| 2,268,195 | Winans | Dec. 30, 1941 |
| 2,307,693 | Linder | Jan. 5, 1943 |
| 2,390,250 | Hansell | Dec. 4, 1945 |
| 2,427,888 | Warren | Sept. 23, 1947 |
| 2,434,713 | Mueller | Jan. 20, 1948 |
| 2,472,779 | Selgin | June 7, 1949 |
| 2,511,143 | Adler | June 13, 1950 |